(12) United States Patent
Weissman et al.

(10) Patent No.: US 8,943,259 B2
(45) Date of Patent: Jan. 27, 2015

(54) RELIEVING MEMORY PRESSURE IN A HOST USING DATABASE MEMORY MANAGEMENT

(75) Inventors: Boris Weissman, Palo Alto, CA (US); Aleksandr V. Mirgorodskiy, San Mateo, CA (US); Ganesh Venkitachalam, Mountain View, CA (US); Feng Tian, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 212 days.

(21) Appl. No.: 12/946,971

(22) Filed: Nov. 16, 2010

(65) Prior Publication Data

US 2012/0124270 A1  May 17, 2012

(51) Int. Cl.
G06F 9/455 (2006.01)
G06F 12/02 (2006.01)
G06F 17/30 (2006.01)

(52) U.S. Cl.
CPC .......... *G06F 9/45558* (2013.01); *G06F 12/023* (2013.01); *G06F 17/3048* (2013.01); *G06F 2212/163* (2013.01); *G06F 2212/151* (2013.01); *G06F 2009/45583* (2013.01)
USPC ............. 711/6; 711/170; 711/E12.006; 718/1

(58) Field of Classification Search
None
See application file for complete search history.

(56) References Cited

U.S. PATENT DOCUMENTS

| | | | |
|---|---|---|---|
| 7,433,951 B1 | 10/2008 | Waldspurger | |
| 7,702,843 B1 | 4/2010 | Chen et al. | |
| 7,716,446 B1 | 5/2010 | Chen et al. | |
| 8,024,736 B1 | 9/2011 | Graupner et al. | |
| 8,095,931 B1 | 1/2012 | Chen et al. | |
| 8,583,875 B1 | 11/2013 | Garthwaite et al. | |
| 2004/0078541 A1* | 4/2004 | Lightstone et al. | 711/171 |
| 2004/0230794 A1* | 11/2004 | England et al. | 713/164 |
| 2006/0101224 A1* | 5/2006 | Shah et al. | 711/173 |
| 2007/0233990 A1* | 10/2007 | Kuczynski et al. | 711/170 |
| 2007/0233991 A1* | 10/2007 | Diao et al. | 711/170 |
| 2009/0006801 A1* | 1/2009 | Shultz et al. | 711/170 |
| 2010/0169536 A1* | 7/2010 | Shedel et al. | 711/6 |
| 2010/0250868 A1* | 9/2010 | Oshins | 711/154 |
| 2010/0306444 A1* | 12/2010 | Shirley et al. | 711/6 |
| 2011/0082962 A1 | 4/2011 | Horowitz et al. | |
| 2011/0138147 A1* | 6/2011 | Knowles et al. | 711/170 |
| 2011/0320682 A1 | 12/2011 | McDougall et al. | |
| 2012/0124305 A1 | 5/2012 | Weissman et al. | |
| 2012/0233435 A1 | 9/2012 | Ben-Yehuda | |
| 2013/0290595 A1* | 10/2013 | Weissman et al. | 711/6 |

OTHER PUBLICATIONS

Surajit Chaudhuri et al. "Self-Tuning Technology in Microsoft SQL Server." Jun. 1999. IEEE. Bulletin of the Technical Committee on Data Engineering. vol. 22. pp. 20-27.*
Rik van Riel. "Page replacement in Linux 2.4 memory management." Jun. 2001. USENIX. FREENIX '01.*

(Continued)

*Primary Examiner* — Nathan Sadler

(57) ABSTRACT

Memory of a database management system (DBMS) that is running in a virtual machine is managed using techniques that integrate DBMS memory management with virtual machine memory management. Because of the integration, the effectiveness of DBMS memory management is preserved even though the physical memory allocated to the virtual machine may change during runtime as a result of varying memory demands of other applications, e.g., instances of other virtual machines, running on the same host computer as the virtual machine.

21 Claims, 4 Drawing Sheets

(56) References Cited

OTHER PUBLICATIONS

Ahmed A. Soror et al. "Automatic Virtual Machine Configuration for Database Workloads." Jun. 2008. ACM. SIGMOD '08.*
"SQL server memory usage within a container." Aug 2008. http://forum.parallels.com/pda/index.php/t-81663.html.*
VMware. "vSphere Guest Programming Guide." May 2009. http://www.vmware.com/support/developer/guest-sdk/guest_sdk_40.pdf.*
Carlo Curino et al. "Workload-Aware Database Monitoring and Consolidation." Jun. 2011. ACM. SIGMOD '11.*
Mike Ruthruff et al. "Running SQL Server with Hyper-V Dynamic Memory." Jul. 2011. Microsoft.*
Waldspurger, Carl A. "Memory Resource Management in VMware ESX Server", in Proc. Fifth Symposium on Operating Systems Design and Implementation (OSDI '02), Dec. 2002, pp. 1-14.
David Black et al., "OSF/1 Virtual Memory Improvements," Oct. 1991, USENIX, Mach Symposium, pp. 87-103.
Surajit Chaudhuri et al., "Self-Tuning Technology in Microsoft SQL Server," Jun. 1999, IEEE, Bulletin of the Technical Committee on Data Engineering, vol. 22, pp. 20-27.

* cited by examiner

RELIEVING MEMORY PRESSURE IN A HOST USING DATABASE MEMORY MANAGEMENT

CROSS-REFERENCE TO RELATED APPLICATIONS

This application is related to U.S. patent application Ser. No. 12/946,940 entitled "Method and System for Integrating Database Memory Management In Virtual Machines", U.S. patent application Ser. No. 12/946,940, which is assigned to the assignee of this application and has been filed on the same day as this application.

BACKGROUND

Due to the specialized ways that database management systems (DBMS) utilize memory to access data, a DBMS typically implements its own memory management techniques rather than relying on more general memory management techniques that are provided by the underlying operating system on which the DBMS runs. For example, a DBMS may expressly request that the operating system allocate to it a portion of memory so that it can manage such memory on its own, thereby avoiding triggering of memory management techniques (disk swaps, LRU page replacement algorithms, etc.) that the underlying operating system may typically use to "over-commit" its available physical memory in an effort to provide running applications a larger "virtual" memory space in which to execute. That is, although the operating system may provide the DBMS a virtual memory space that is larger than the portion of allocated physical memory requested by the DBMS application, the DBMS application can, using its own memory management techniques, ensure that it utilizes its virtual memory space within the bounds of its allocated physical memory and therefore avoid any operating system level memory management activities that would otherwise adversely affect performance of the DBMS (e.g., untimely writes to swap disk, etc.).

Tuning the DBMS memory has been at the forefront of database research. Recently, autonomic techniques for tuning the memory of DBMS at runtime have been developed for some commercial relational databases. One such technique employs memory pools, each employing specialized paging policies apart from the paging policies of the operating system. Tuning parameters in this technique include the amount of memory to be allocated to these pools and how that memory is to be divided among the various memory pools.

The largest of the memory pools is the buffer pool, which contains the memory pages of database tables that are actively involved in transaction processing. As a transaction modifies rows in database tables, the pages containing these rows are brought into the buffer pool from disk and are modified in place. When the transaction is eventually committed by the DBMS, these "dirty" pages are flushed to disk under the control of the DBMS, for example, by atomically writing a record relating to committed transaction into a write-ahead transaction log on disk to ensure that the transaction's changes are never lost. It should be noted that the DBMS, not the operating system, determines when dirty pages of the buffer pool are written to disk.

In addition, the DBMS, implementing its own memory management, typically maintains its own free list of memory pages and memory page descriptor data structures that are separate and different from any memory management based free memory page lists and data structures maintained by the operating system. Indeed, a memory page that the DBMS may regard as free (e.g., because it has recently completed a database query transaction relating to the data in the memory page) may actually appear to the operating system to be a more important memory page because the DBMS has recently accessed the memory page. As an additional example, memory page descriptor data structures maintained by the DBMS may indicate which memory pages are "clean" and which ones are not. Clean memory pages are those that contain data that matches the corresponding data stored in the database on disk. Because the operating system has no knowledge that the DBMS utilizes portions of its allocated memory as an in-memory cache of the data it stores in the database on disk (e.g., for faster access and query response times), it is not able to similarly characterize the memory pages used by the DBMS.

The DBMS's own memory management techniques referenced above work well when the DBMS is the only application running on a host computer and is able to ensure its own allocation of physical memory. However, when a DBMS is run in a virtual machine that is hosted on a computer with other virtual machines, the host computer's physical memory is managed by virtualization software (sometimes referred to as a hypervisor) that dynamically allocates physical memory among the virtual machines over time, depending upon the particular memory needs of the virtual machines at particular points in time. That is, the hypervisor may over-commit the physical memory of the host computer (sometimes referred to as "machine" memory), providing each virtual machine an illusion that it possesses a certain amount of physical memory (referred to as "guest" physical memory) while allocating actual machine memory to the virtual machine only when it needs it. Over-committing machine memory by the hypervisor in this manner facilitates more efficient use of machine memory because, typically, some virtual machines are lightly loaded while others are more heavily loaded, and relative activity levels vary over time. When the hypervisor experiences memory pressure, for example, because a particular virtual machine requires more machine memory than it is has been allocated, the hypervisor may utilize a variety of techniques to request other virtual machines to "release" allocated machine memory pages back to the hypervisor (for re-allocation to the virtual machine needing more memory). One such technique, known as ballooning, relies on the memory management techniques of the operating systems in the virtual machine (referred to as "guest" operating system) to identify memory pages that may be the best candidates for release to the hypervisor. However, as discussed, if a DBMS application is running in the virtual machine, the operating system's memory management techniques may conflict with the DBMS application's own memory management techniques, thereby resulting in the possible release of memory pages to the hypervisor that may have been important to the DBMS application. Indeed, when the memory needs of the other virtual machines are high, the DBMS, as initially tuned, may be forced to run with insufficient physical or virtual memory available to the virtual machine, resulting in undesirable page thrashing either in the virtual machine or the hypervisor. As a result, the initially tuned parameters for a DBMS may not be applicable to the DBMS running in a virtual machine over the course of time due to the memory over-commitment and management activities of the hypervisor.

SUMMARY

One or more embodiments of the present invention provide techniques for managing memory of a DBMS running in a virtual machine. These techniques integrate DBMS memory management with virtual machine memory management to preserve the effectiveness of DBMS memory management even though the physical memory allocated to the virtual machine may change during runtime as a result of varying memory demands of other applications, e.g., instances of other virtual machines, running on the same host computer as the virtual machine.

A method of managing memory of a database management system running in a virtual machine instantiated on a host computer, according to an embodiment of the present invention, includes the steps of determining that a hypervisor has requested memory from a guest operating system of the virtual machine for re-allocation by the hypervisor, and upon said determining, releasing an amount of memory allocated to the database management system in accordance with a memory management policy of the database management system, to the guest operating system.

Further embodiments of the present invention include, without limitation, a non-transitory computer-readable storage medium that includes instructions that enable a processing unit to implement one or more aspects of the above methods as well as a computer system configured to implement one or more aspects of the above method.

DETAILED DESCRIPTION

Figure 1:
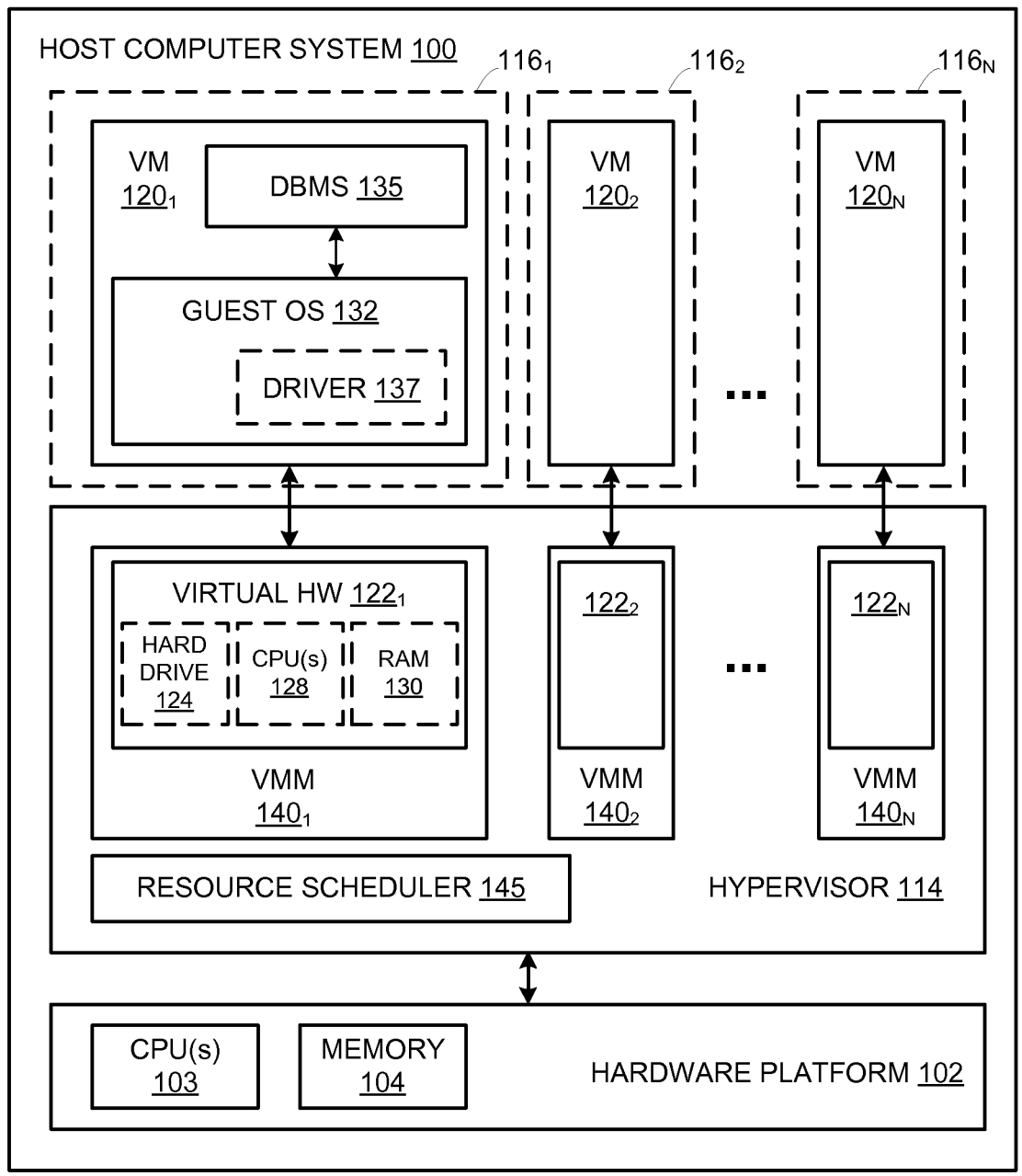
FIG. 1 depicts a block diagram of a virtualized computer system in which one or more embodiments of the present invention may be practiced.

FIG. 1 depicts a block diagram of a virtualized computer system in which one or more embodiments of the present invention may be practiced. Host computer system 100 may be constructed on a desktop, laptop or server grade hardware platform 102 such as an x86 architecture platform. Hardware platform 102 includes one or more central processing units (CPUs) 103, host physical memory 104, and other standard hardware components (not shown). A hypervisor 114 is installed on top of hardware platform 102. Hypervisor 114 supports multiple virtual machine execution spaces $116_1$-$116_N$, within each of which a VM process may be executed to instantiate corresponding VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware, such as virtual hard drive 124, one or more virtual CPUs 128, and guest physical RAM 130, that are illustrated in FIG. 1 for VM $120_1$. Each virtual hardware platform 122 supports the installation of a guest operating system (OS), which may be any commodity operating system that is compatible therewith. In each instance, the guest operating system provides user-level applications running in the virtual machine an interface to the virtual hardware platform of the virtual machine.

In the embodiments of the present invention described herein, a database management system (DBMS) 135 is running on guest OS 132 and includes various memory management modules. As will be further described below in conjunction with FIG. 2, these memory management modules communicate with a driver 137 of guest OS 132 to carry out memory management according to one or more embodiments of the present invention. Driver 137 is responsive to memory management commands from hypervisor 114, in particular a resource scheduler module 145 and operates as a balloon driver that is, for example, described in U.S. Pat. No. 7,433,951, entitled "System and Method for Controlling Resource Revocation in a Multi-Guest Computer System," the entire contents of which are incorporated by reference herein.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware's vSphere product, which is commercially available from VMware, Inc. of Palo Alto, Calif. ("VMware"). It should further be recognized that other virtualized computer systems are contemplated, such as hosted virtual machine systems, where the hypervisor is implemented in conjunction with a host operating system.

Figure 2:
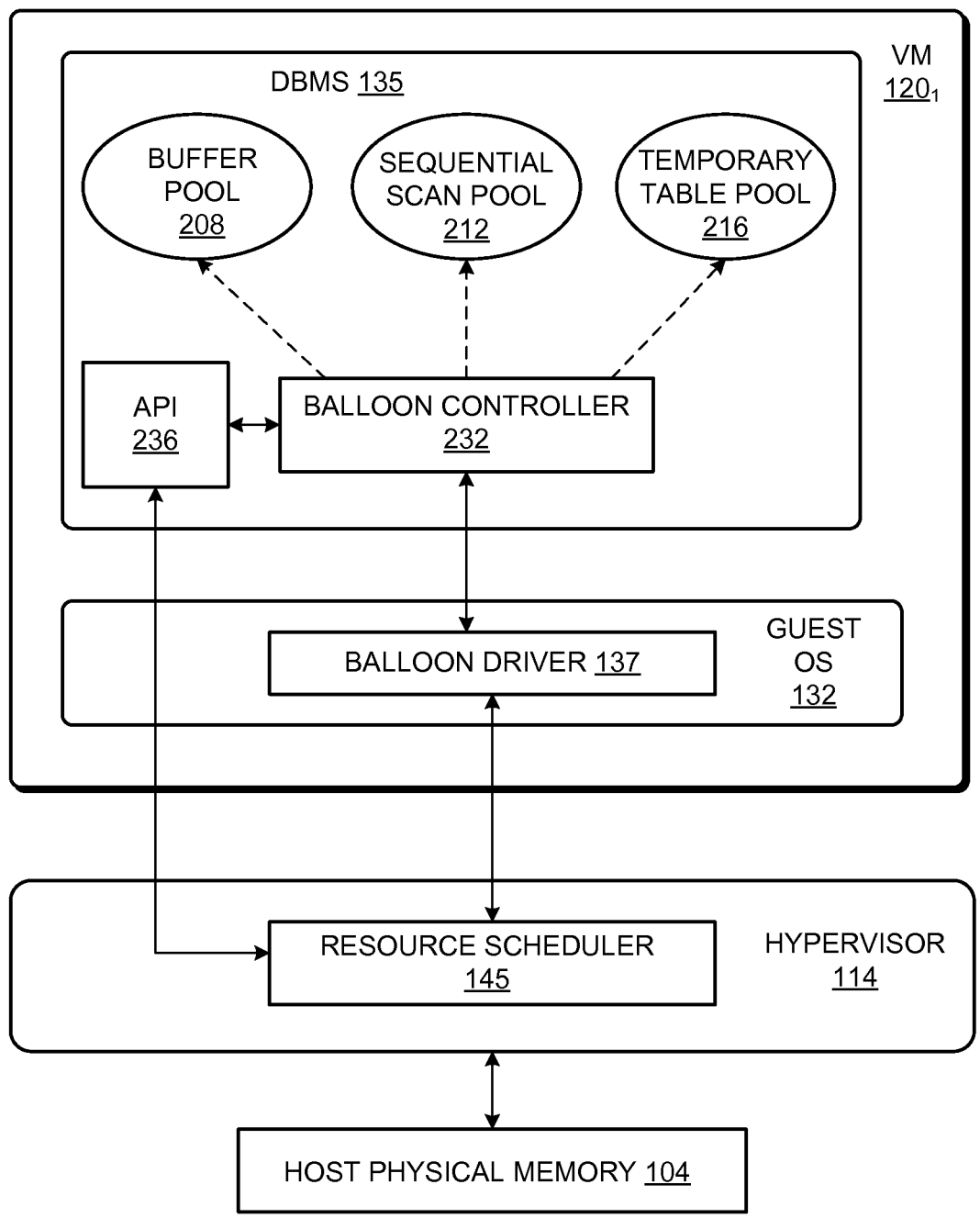
FIG. 2 is a conceptual diagram of the virtualized computer system of FIG. 1 that illustrates the method of managing memory of a database management system, according to one or more embodiments of the present invention.

FIG. 2 is a conceptual diagram of the virtualized computer system of FIG. 1 that illustrates the method of managing memory of a database management system, according to one or more embodiments of the present invention. The conceptual diagram of FIG. 2 depicts DBMS 135 running in VM $120_1$ on top of guest OS 132, which includes balloon driver 137. Resource scheduler 145 communicates with balloon driver 137 and, in the process of carrying out memory management for VMs 120, may instruct balloon driver 137 to "inflate" or "deflate." The inflate command would be issued when host computer system 100 comes under memory pressure. The deflate command would be issued when the memory pressure has been relieved. Each inflate or deflate command includes an indication of a number of guest memory pages, referred to herein as a "balloon target." The balloon target associated with an inflate or deflate command represents the number of guest physical memory pages (or corresponding amount of memory) that resource scheduler 145 would like to reclaim from guest OS 132 or return to guest OS 132, respectively.

DBMS 135 includes a balloon controller 232 which queries resource scheduler 145 on a periodic basis, e.g., once per second. In one embodiment, in order to perform such querying, balloon controller 232 leverages an application programming interface (API) 236 to access special runtime components (e.g., dynamically loaded libraries, shared memory objects, etc.) that have been installed in guest OS 132 that provide "backdoor" access for an application to hypervisor 114 to obtain data about the state and performance of the virtual machine in which the application is running (e.g., such data that may be only known by hypervisor 114). One example of such an API is VMware's vSphere Guest API that interacts with the vSphere Guest SDK runtime components that are part of the VMware Tools product. It should be recognized that other techniques, such as utilizing hypercalls and other similar backdoor means for an application to communicate with hypervisor 114 may be utilized in other embodiments. Balloon controller 232 (via API 236) queries resource scheduler 145 for a variety of runtime information including the balloon target (and corresponding inflate or deflate request) and the host physical memory currently available (e.g., actually allocated) to virtual machine $120_1$. In another embodiment, balloon controller 232 may register itself with balloon driver 137 to receive the balloon target (and corresponding inflate or deflate request) directly from balloon driver 137 (and balloon driver 137 may accordingly be configured to notify or respond to balloon controller 232). It should be recognized that the host physical memory available to virtual machine $120_1$ may vary over time depending on the amount of host physical memory 104 used by all VMs 120 running on host computer system 100.

In one embodiment, in addition to assisting with inflate or deflate commands from resource scheduler 145, balloon controller 232, during normal operations of DBMS 135, continually manages and resizes the sizes of memory pools of DBMS 135 that have been initially tuned for optimal memory management with the VM $120_1$, when DMBS 135 is the only application running in VM $120_1$ and VM $120_1$ is the only virtual machine running on hypervisor 114. The memory pools shown in FIG. 2 include buffer pool 208, sequential scan pool 212, and temporary table pool 216. In one embodiment, memory pools are executing components of DBMS 135 that have the responsibility of managing certain portions of the memory allocated to DBMS 135 (e.g., each such portion, a "pool"), for example, by implementing policies that allocate or deallocate memory pages to the pool in a manner tailored to the particular usage of the pool by DBMS 135. It should be recognized, however, that memory pools may also refer to the allocated portion of memory itself (rather than the executing component), as the context requires. It should be also recognized that the three memory pools shown in FIG. 2 are for illustration and any number and type of memory pools may be provided in the embodiments of the present invention. In response to an inflate or deflate command originating from resource scheduler 145 or due to changes in available host memory to VM $120_1$ during the normal course of execution of DBMS 135, balloon controller 232 may issue requests to any one (or all) of the memory pools to evict or allocate memory pages according to the memory pool's own memory management policies.

In one embodiment, each of the memory pools 208, 212, 216 maintains a page descriptor data structure. The page descriptor data structure distinguishes between free and used guest memory pages and marks used guest memory pages as dirty or not dirty (clean). In accordance with the memory pool's own memory management policies, the free memory pages may, for example, be preferentially evicted before used memory pages and clean memory pages may be preferentially evicted before dirty memory pages, because in both cases the evictions would not require a corresponding write to a backing store, which would be a virtual hard drive 124 in this embodiment. When there are not enough free or clean memory pages, dirty memory pages will need to be selected for eviction, and these will require a corresponding write to the backing store.

It should be recognized that some memory pools of DBMS 135 (not shown in FIG. 2) do not maintain page descriptor data. One example is a private memory pool that is often used by sort operators. The private memory pool is not tracked on a per page basis. Instead, DBMS 135 maintains other statistics on the usefulness of private memory usage, e.g., how much sort memory is actively used, the rate of sort or hashing operators, etc.

The memory portion managed by buffer pool 208 operates as a large cache for accessing the actual data of the database that is stored on disk. For example, database tables and indexes may be cached by buffer pool 208 so that query transactions can be serviced by DBMS 135 in-memory without accessing the slow database disk. Buffer pool 208 may implement any policy for evicting and allocating memory pages. In one embodiment, memory pages from buffer pool 208 are evicted in the context of a process or thread of balloon controller 232. In an alternative embodiment, balloon controller 232 parallelizes this task by distributing its parts across multiple backend threads or processes.

DBMS 135 may also use a sequential scan pool 212, for example, to manage memory to facilitate operations that would perform large sequential scans of the data stored on the database disk. For example, a database query that cannot use a previously created database index might scan an entire database table on disk. Sequential scan pool 212 is used in such instances to prevent such operations from polluting buffer pool 208 with cached pages of data from the database that are not likely to be accessed in the near future. In a typical implementation, sequential scan pool 212 employs a special fixed-size ring data structure and an allocation or eviction request from balloon controller 232 causes a resizing of this ring data structure.

Temporary table pool 216 manages memory for temporary tables that have a lifetime that may be limited to either a session or a transaction, generally do not generate write-ahead log records, and cannot be recovered in the event of a crash. Temporary table pool 216 can thus be resized independently of buffer pool 208 in response an allocation or eviction request from balloon controller 232.

Figure 3:
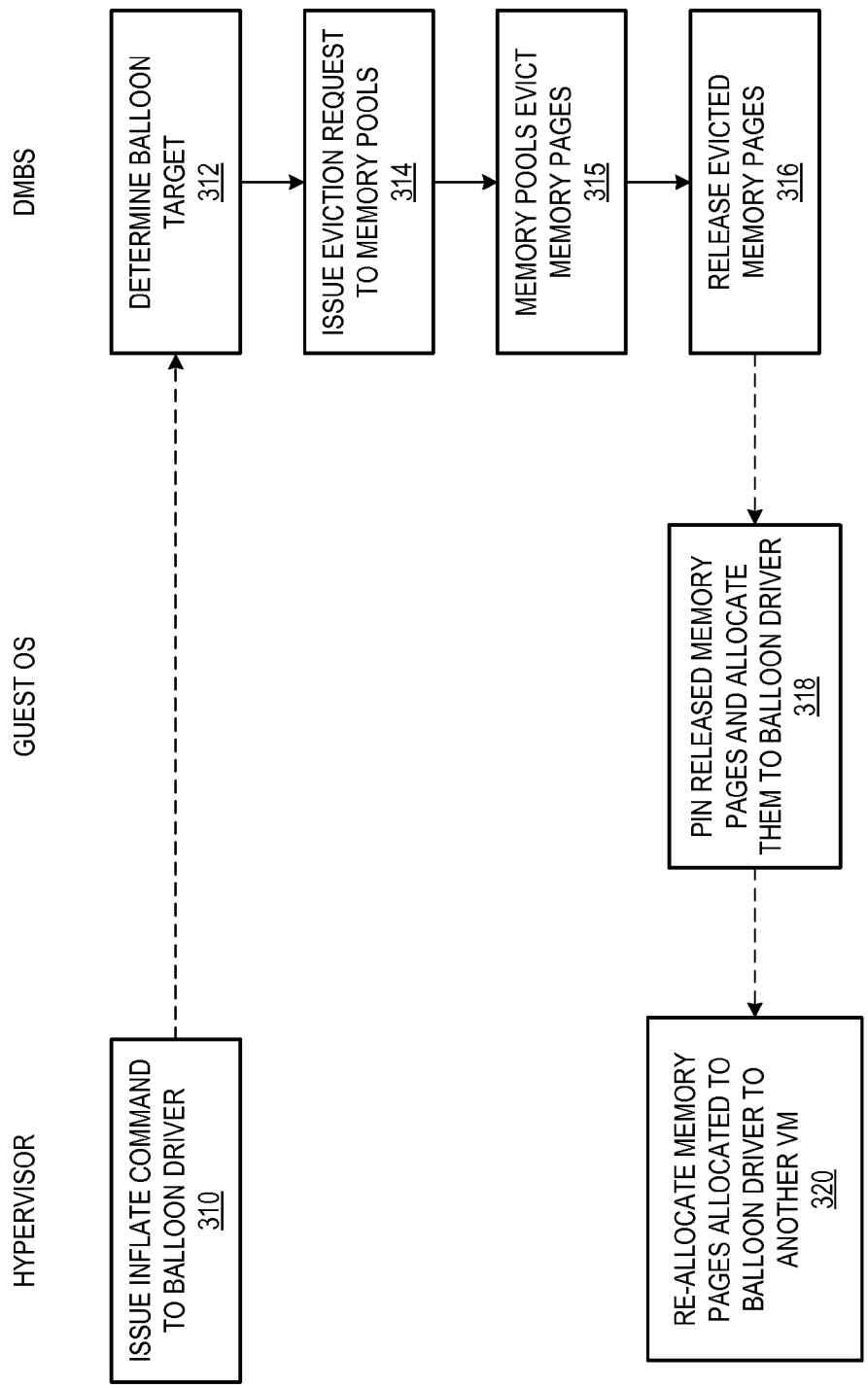
FIG. 3 is a flow diagram that illustrates the method of managing memory of a database management system, according to one or more embodiments of the present invention.

FIG. 3 is a flow diagram that illustrates a method of managing memory of a database management system that integrates DBMS memory management with virtual machine memory management. In the embodiment of the method described herein, the steps of the method are carried out by hypervisor 114, guest OS 132, DBMS 135, and specific components thereof. The method begins when hypervisor 114 decides to reallocate memory from VM $120_1$ to another VM.

At step 310, resource scheduler 145 issues inflate commands to balloon drivers running in VMs 120, including balloon driver 137 of VM $120_1$. The inflate command to balloon driver 137 includes a balloon target. At step 312, balloon controller 232 determines this balloon target (and the inflate command), for example, by querying resource scheduler 145 via its periodic polling through the aforementioned API (or receiving it directly from balloon driver 137). At step 314, balloon controller 232 issues an eviction request to each of the memory pools 208, 212, 216, in response to which the memory pools 208, 212, 216 each evict memory pages according to the policies implemented in them (step 315). It should be recognized that in alternative embodiments balloon controller 232 may only request certain memory pools to evict memory pages. Similarly, in alternative embodiments, balloon controller 232 may specifically request a number of memory pages (or amount of memory) for eviction depending upon the value of the balloon target. At step 316, balloon controller 232 releases the memory pages evicted by the memory pools 208, 212, 216 at step 314 to guest OS 132. In one embodiment where guest OS 132 is Linux, this is accomplished by madvise (MADV_REMOVE), which frees a range of guest memory pages and associated backing store. Afterwards, guest OS 132 is free to reuse these guest memory pages for any tasks including pinning such memory pages (e.g., so that they are not subsequently paged out to disk during performance of memory management by guest OS 132) and allocating them to balloon driver 137 in response to an inflate command from resource scheduler 145, which occurs at step 318. At step 320, after the memory pages evicted from the memory pools 208, 212, 216 have been pinned and allocated to balloon driver 137 (and balloon driver 137 has notified hypervisor 114 thereof), hypervisor 114 re-allocates these pinned memory pages to another VM according to conventional ballooning techniques. The number of memory pages freed by DMBS 135 while carrying out steps 312 through 316 may satisfy all or part of the balloon target. If it is less than the balloon target, the rest is satisfied by balloon driver 137 according to the standard ballooning techniques, such as those described in U.S. Pat. No. 7,433,951.

According to one or more embodiments of the present invention, balloon controller 232 implements a proportional allocation policy to preserve, over the course of the execution of DBMS 135, the relative memory pool sizes with respect to each other and to the total amount of host physical memory currently available (e.g., currently allocated) to VM $120_1$ as this amount may change in response to other VM activity on host computer system 100. For example, as previously discussed, balloon controller 232 periodically queries resource scheduler 145 for the available host physical memory to VM $120_1$ in order to implement this policy. This policy relies on results from an initial DBMS tuning performed with VM $120_1$ running as the stand-alone virtual machine so that there is no competition for resources with other virtual machines running on top of hypervisor 114. Any technically feasible method for DBMS tuning on a host computer system may be carried out to obtain the initial memory pool sizes. From each of the initial memory pools sizes, a ratio reflecting the memory pool size to the total amount of host physical memory available to VM $120_1$ in the absence other VMs competing for host physical memory. The computed ratios represent the "target" ratios for the memory pools while DBMS 135 is executing. During execution, balloon controller 232 periodically (e.g., as regular intervals) re-computes the actual ratios using the current pool memory sizes and the total amount of host physical memory available to VM $120_1$ at the time of recomputation Any deviations from the target ratios trigger resizing of the affected memory pools via memory pool-specific allocation and eviction operations.

Figure 4:
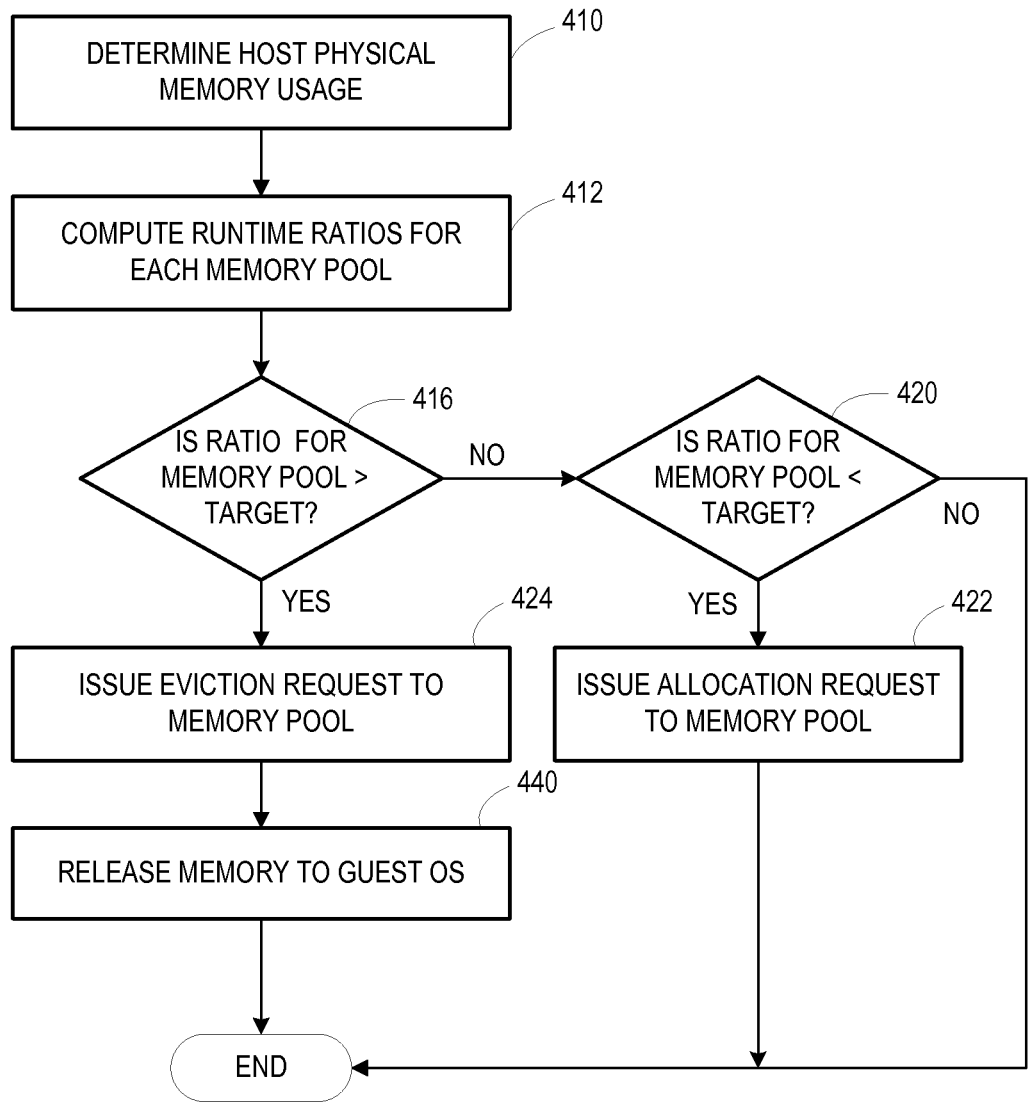
FIG. 4 is a flow diagram that illustrates the method of resizing memory pools of a database management system running in a virtual machine, according to one or more embodiments of the present invention.

FIG. 4 is a flow diagram that illustrates the method of resizing memory pools of a database management system running in a virtual machine, according to one or more embodiments of the present invention. In the embodiment of the method described herein, the steps of the method are carried out by balloon controller 232 of DBMS 135. The method is periodically triggered at regular intervals during the course of execution of DBMS 135.

At step 410, balloon controller 232 determines the host physical memory currently available to VM $120_1$ by, for example, querying resource scheduler 145 as previously discussed. At step 412, balloon controller 232 computes the ratios for each of the memory pools 208, 212, 216 based on its current size and the host physical memory available to VM $120_1$ determined in step 410. At step 416, balloon controller 232 determines if the computed ratio of any memory pool is greater than the target ratio for that memory pool. If yes, the method proceeds to step 424, where balloon controller 232 issues an eviction request to the memory pool whose computed ratio is greater than its target ratio, requesting that the memory pool evict an appropriate amount of memory pages so that the computed ratio matches (or more closely matches) the target ratio, and then to step 440. If no, step 420 is carried out. At step 420, balloon controller 232 determines if the computed runtime ratio of any memory pool is less than the target ratio for that memory pool. If yes, the method proceeds to step 422, where balloon controller 232 issues a allocation request to the memory pool whose computed runtime ratio is less than its target ratio, requesting that the memory pool allocate for itself more memory pages so that the computed ration matches or more closes matches the target ratio. The method then ends. If no, the method skips step 422 directly to the end. At step 440, balloon controller 232 releases to guest OS 132 the memory pages evicted by the memory pools 208, 212, 216 pursuant to any eviction requests. As described above, in one embodiment where guest OS 132 is Linux, this is accomplished by madvise (MADV_REMOVE), which frees a range of guest memory pages and associated backing store. It should be recognized that the method of FIG. 4 may further be used by balloon controller 232 in the context FIG. 3 (namely steps 314-316) to determine which memory pools (and how many memory pages in such memory pools) should be requested to proportionally evict memory pages to assist with inflate commands originating from resource scheduler 145 (or, conversely, proportionally re-allocate memory pages to memory pools to take advantage of a deflate command originating from resource scheduler 145). The method ends after step 440.

When the balloon target changes at a fast rate, maintaining the requested eviction rate may be challenging for balloon controller 232 if a substantial number of pages are dirty. For example, when memory pools are backed by conventional hard disk storage, the rate of eviction of dirty pages is limited by the storage I/O bandwidth. Rotating disks are especially unforgiving for random accesses and online transaction processing (OLTP) loads generally result in buffer pool populated in random order. Several possible optimizations to the techniques described above may be applied.

In one embodiment, if changes to the eviction order are tolerable, the eviction policy might be adjusted in favor of evicting clean memory pages over dirty ones. Since evicting clean memory pages does not require writes to the backing store, this increases the speed of memory page eviction.

In another embodiment, the policy of the preferential clean memory page eviction may be modified such that only a fraction of all clean memory pages are evicted preferentially with the rest of the balloon target satisfied from dirty memory pages to limit the damage to the DBMS working set.

In some embodiments, it may be possible for DBMS 135 to identify a sufficient number of eviction candidates before writing any dirty memory pages to the backing store. If it is possible, the dirty memory pages to be evicted are sorted by their position on disk (disk block numbers) and the writes are performed according to the sorted order and merged where possible.

In a further embodiment, to avoid a sharp drop in transaction throughput, balloon controller 232 may employ a technique of writing out dirty memory pages in bulk to temporary files in a sequential fashion while maintaining indexing data structures pointing to their temporary locations. These memory pages can then be lazily paged in from the temporary locations over a longer time period.

In the embodiments described above, balloon controller 232 is implemented as a module within DBMS 135. It should be recognized that, in other embodiments, balloon controller 232 may be a standalone process dedicated to managing the memory pools of DBMS 135. In another embodiment, balloon controller 232 may reside in hypervisor 114, so that balloon controller 232 may be shared among two or more DBMS running in the same virtual machine or different virtual machines. Such sharing of balloon controller 232 permits the different instances of DBMS to reclaim memory on behalf of hypervisor 114 but in a DBMS-specific fashion.

Furthermore, in alternative embodiments of the present invention, guest memory freed by DBMS 135 may be released directly by a user-level thread or process running in DBMS 135, without calling into a kernel driver of guest OS 132. This can be achieved, for example, by extending hypervisor 114 with a hyper-call (a special existing instruction or any trapping instruction), which the user-level thread or process running in DBMS 135 can execute to trap into hypervisor 114 and release memory directly.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing memory of a database management system running on a guest operating system in a virtual machine, the virtual machine being instantiated on a host computer, the method comprising:
   determining, by a controller running in the database management system, that a hypervisor has issued a first command to request memory from a driver running in the guest operating system of the virtual machine for re-allocation by the hypervisor;
   in response to determining that the hypervisor has issued the first command, performing:
      determining, by the controller, one or more memory pools in a plurality of memory pools, each memory pool managing a portion of memory allocated to the database management system;
      issuing, by the controller, one or more second commands to the one or more memory pools to analyze respective portions of memory, wherein the one or more memory pools determine memory to release from respective portions of memory based on a respective memory management policy for the one or more memory pools; and
      releasing, by the controller, an amount of memory allocated to the database management system in accordance with the memory that the one or more memory pools determined to release from respective portions of memory to the guest operating system, wherein the guest operating system allocates the released memory to the driver for satisfying the first command.

2. The method of claim 1, further comprising:
   determining an amount of memory the hypervisor requested from the guest operating system in the first command,
   wherein the amount of memory released is equal to the amount of memory requested.

3. The method of claim 1, further comprising:
   determining an amount of memory the hypervisor requested from the guest operating system in the first command,
   wherein the amount of memory released is less than the amount of memory requested.

4. The method of claim 1, wherein a memory space of the database management system is partitioned into the plurality of memory pools, and sizes of the memory pools are decreased in a proportional manner to free up the memory for release to the guest operating system.

5. The method of claim 4, wherein the size of each memory pool is decreased according to a respective memory eviction policy of each memory pool.

6. The method of claim 5, wherein, in at least one of the memory pools, memory pages indicated as being free are evicted prior to memory pages indicated as being used and memory pages indicated as being clean are evicted prior to memory pages indicated as being dirty.

7. The method of claim 1, wherein the first command by the hypervisor for memory from the guest operating system is determined by polling the hypervisor through a backdoor channel.

8. The method of claim 1, further comprising:
when the hypervisor reduces an amount of memory requested from the guest operating system, de-allocating memory from the driver.

9. The method of claim 8, further comprising:
determining that the hypervisor has reduced the amount of memory requested from the guest operating system; and
upon said determining, increasing the amount of memory allocated to the database management system in accordance with respective memory management policies of the one or more memory pools.

10. The method of claim 1, wherein the guest operating system manages the released amount of memory in coordination with the first command from the hypervisor.

11. The method of claim 1, wherein:
the first command includes a memory target, and
the controller includes a database memory target for an amount of memory to release in the one or more second commands based on the memory target.

12. A non-transitory computer readable storage medium storing instructions for a database management system running on a guest operating system in a virtual machine, the virtual machine being instantiated on a host computer, wherein the instructions, when executed in the host computer, cause the host computer to carry out the steps of:
determining, by a controller running in the database management system, that a hypervisor has issued a first command to request memory from a driver running in the guest operating system of the virtual machine for re-allocation by the hypervisor;
in response to determining that the hypervisor has issued the first command, performing:
determining, by the controller, one or more memory pools in a plurality of memory pools, each memory pool managing a portion of memory allocated to the database management system;
issuing, by the controller, one or more second commands to the one or more memory pools to analyze respective portions of memory, wherein the one or more memory pools determine memory to release from respective portions of memory based on a respective memory management policy for the one or more memory pools; and
releasing, by the controller, an amount of memory allocated to the database management system in accordance with the memory that the one or more memory pools determined to release from respective portions of memory to the guest operating system, wherein the guest operating system allocates the released memory to the driver for satisfying the first command.

13. The non-transitory computer readable storage medium of claim 12, wherein the amount of memory released is equal to an amount of memory requested by the hypervisor in the first command.

14. The non-transitory computer readable storage medium of claim 12, wherein the amount of memory released is less than an amount of memory requested by the hypervisor in the first command.

15. The non-transitory computer readable storage medium of claim 12, wherein the request by the hypervisor for memory from the guest operating system is determined by polling the hypervisor through a backdoor channel.

16. The non-transitory computer readable storage medium of claim 12, wherein:
the first command includes a memory target, and
the controller includes a database memory target for an amount of memory to release in the one or more second commands based on the memory target.

17. A computer system comprising one or more processors and physical memory, the processors executing instances of virtual machines, one of which has a database management system running on a guest operating system therein, and programmed to:
determine, by a controller running in the database management system, that a hypervisor has issued a first command to request memory from a driver running in the guest operating system of the virtual machine for re-allocation by the hypervisor;
in response to determining that the hypervisor has issued the first command, performing:
determine, by the controller, one or more memory pools in a plurality of memory pools, each memory pool managing a portion of memory allocated to the database management system;
issue, by the controller, one or more second commands to the one or more memory pools to analyze respective portions of memory, wherein the one or more memory pools determine memory to release from respective portions of memory based on a respective memory management policy for the one or more memory pools; and
release, by the controller, an amount of memory allocated to the database management system in accordance with the memory that the one or more memory pools determined to release from respective portions of memory to the guest operating system, wherein the guest operating system allocates the released memory to the driver for satisfying the first command.

18. The computer system of claim 17, wherein the amount of memory released is equal to an amount of memory requested by the hypervisor in the first command.

19. The computer system of claim 17, wherein the amount of memory released is less than an amount of memory requested by the hypervisor in the first command.

20. The computer system of claim 17, wherein the request by the hypervisor for memory from the guest operating system is determined by polling the hypervisor through a backdoor channel.

21. The computer system of claim 17, wherein:
the first command includes a memory target, and
the controller includes a database memory target for an amount of memory to release in the one or more second commands based on the memory target.

* * * * *